United States Patent
Narayanam et al.

(10) Patent No.: US 10,732,883 B1
(45) Date of Patent: Aug. 4, 2020

(54) STORAGE LAYER SELECTION BASED UPON INFORMATION ASSIGNMENT

(71) Applicant: International Business Machines Corporation, Armonk, NY (US)

(72) Inventors: Krishnasuri Narayanam, Bangalore (IN); Shashank Mujumdar, Nagpur (IN); Sameep Mehta, New Delhi (IN); Deepak Vijaykeerthy, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/259,649

(22) Filed: Jan. 28, 2019

(51) Int. Cl.
G06F 3/06 (2006.01)
G06N 20/00 (2019.01)

(52) U.S. Cl.
CPC ............ *G06F 3/0647* (2013.01); *G06F 3/061* (2013.01); *G06F 3/0608* (2013.01); *G06F 3/0685* (2013.01); *G06N 20/00* (2019.01)

(58) Field of Classification Search
None
See application file for complete search history.

(56) References Cited

U.S. PATENT DOCUMENTS

| | | |
|---|---|---|
| 6,098,064 A | 8/2000 | Pirolli et al. |
| 7,596,587 B2 | 9/2009 | Berkhin et al. |
| 7,949,637 B1 | 5/2011 | Burke |
| 8,627,035 B2 | 1/2014 | Ambat et al. |
| 8,838,887 B1 | 9/2014 | Burke et al. |
| 8,886,901 B1 | 11/2014 | Hsu et al. |
| 8,996,808 B2 | 3/2015 | Hyde, II et al. |
| 9,116,914 B1 | 8/2015 | Muthirisavenugopal et al. |
| 9,372,630 B2 | 6/2016 | Guo et al. |
| 2013/0325801 A1 | 12/2013 | Bavishi et al. |
| 2018/0018379 A1 | 1/2018 | Eda et al. |

*Primary Examiner* — Kevin Verbrugge (74) *Attorney, Agent, or Firm* — Ference & Associates LLC (57) ABSTRACT

One embodiment provides a method, including: receiving, from an application, information for storage in a storage management system, wherein the storage management system comprises a plurality of storage layers, each storage layer having a different performance and a different cost than the other storage layers; labeling the information with one of a plurality of labels relevant to the application; assigning the information a performance tolerance value based upon the label of the information, wherein the performance tolerance value comprises an estimate of the performance requirement required by the application storing the information; determining a storage layer for storage of the information, wherein the determining comprises identifying one of the plurality of storage layers corresponding to the label of the information and updating metadata of a logical volume corresponding to the information with the performance tolerance value; and sending the information to the determined storage layer.

20 Claims, 4 Drawing Sheets

STORAGE LAYER SELECTION BASED UPON INFORMATION ASSIGNMENT

BACKGROUND

Information is frequently stored in a storage management system having a plurality of storage tiers or layers. For example, an application may store information in the storage management system for later access. This allows the application to have access to the information, but does not require that the application locally store the information. Each of the tiers or layers of the storage management system provides benefits and drawbacks. For example, the storage layers having a higher performance (those that are able to provide responses very quickly to access requests) have a higher cost to the application that stored the information in the storage layer. Conversely, a storage layer that has a lower cost does not provide responses to access requests as quickly. As applications access the information in the storage layers, the storage management system may move the information across storage layers based upon the number or frequency of accesses to the information and how recent the access to the information is. For example, if the application frequently and recently accesses the information, the storage management system may move the information to another layer having a higher performance so that the information can be provided more quickly.

BRIEF SUMMARY

In summary, one aspect of the invention provides a method, comprising: receiving, from an application, information for storage in a storage management system, wherein the storage management system comprises a plurality of storage layers, each storage layer having a different performance and a different cost than the other storage layers; labeling, using a classification algorithm, the information with one of a plurality of labels relevant to the application; assigning the information a performance tolerance value based upon the label of the information, wherein the performance tolerance value comprises an estimate of the performance requirement required by the application storing the information; determining, based upon the performance tolerance value of the information, a storage layer for storage of the information, wherein the determining comprises identifying one of the plurality of storage layers corresponding to the label of the information and updating metadata of a logical volume corresponding to the information with the performance tolerance value; and sending the information to the determined storage layer based upon the metadata of the logical volume.

Another aspect of the invention provides an apparatus, comprising: at least one processor; and a computer readable storage medium having computer readable program code embodied therewith and executable by the at least one processor, the computer readable program code comprising: computer readable program code configured to receive, from an application, information for storage in a storage management system, wherein the storage management system comprises a plurality of storage layers, each storage layer having a different performance and a different cost than the other storage layers; computer readable program code configured to label, using a classification algorithm, the information with one of a plurality of labels relevant to the application; computer readable program code configured to assign the information a performance tolerance value based upon the label of the information, wherein the performance tolerance value comprises an estimate of the performance requirement required by the application storing the information; computer readable program code configured to determine, based upon the performance tolerance value of the information, a storage layer for storage of the information, wherein the determining comprises identifying one of the plurality of storage layers corresponding to the label of the information and updating metadata of a logical volume corresponding to the information with the performance tolerance value; and computer readable program code configured to send the information to the determined storage layer based upon the metadata of the logical volume.

An additional aspect of the invention provides a computer program product, comprising: a computer readable storage medium having computer readable program code embodied therewith, the computer readable program code executable by a processor and comprising: computer readable program code configured to receive, from an application, information for storage in a storage management system, wherein the storage management system comprises a plurality of storage layers, each storage layer having a different performance and a different cost than the other storage layers; computer readable program code configured to label, using a classification algorithm, the information with one of a plurality of labels relevant to the application; computer readable program code configured to assign the information a performance tolerance value based upon the label of the information, wherein the performance tolerance value comprises an estimate of the performance requirement required by the application storing the information; computer readable program code configured to determine, based upon the performance tolerance value of the information, a storage layer for storage of the information, wherein the determining comprises identifying one of the plurality of storage layers corresponding to the label of the information and updating metadata of a logical volume corresponding to the information with the performance tolerance value; and computer readable program code configured to send the information to the determined storage layer based upon the metadata of the logical volume.

A further aspect of the invention provides a method, comprising: receiving application information for storage in a storage system comprising a plurality of storage tiers, each storage tier having a different performance and a different cost to the application than the other storage tiers; determining a storage tier within the storage system for storage of the application information by: classifying the application information to a storage tier by using a machine learning storage tier classifier that maps the application information to a storage tier based upon a function learned during the training phase of the machine learning storage tier classifier; assigning a performance tolerance value to the information based upon the performance requirements of an application storing the application information, wherein the performance tolerance value is based upon the classified storage tier; updating metadata of a logical volume corresponding to the application information with the assigned performance value; and identifying a storage tier corresponding to the classification; and storing the application information in the determined storage tier.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The traditional storage management system is reactive in nature, meaning the storage management system moves the information across storage layers in response to access requests by the application storing the information. The problem with this approach is that information may initially be stored in an incorrect storage layer, thereby causing a delay in responses. For example, if the application intends to access the information frequently and needs a quick response, the application would prefer that the information be stored in a storage layer having a higher performance. However, the storage management system may instead initially store the information in a storage layer having a lower performance. Then, only after the application frequently access the information, will the storage management system move the information to a storage layer having a higher performance. However, the traditional storage management systems do not allow for the application to designate that the information should initially be stored in the higher performance layer.

Additionally, traditional storage management systems require that the movement of information occur in adjacent layers. In other words, when the information is moved from one storage layer to another storage layer, the information must move from one storage layer to an adjacent storage layer without the ability to skip storage layers. Thus, if information is stored in the lowest performance layer and must be moved to the highest performance layer, as determined based upon access frequency, the information must be moved from the lowest performance layer to the next lowest performance layer. The information is stored in this next lowest performance layer until the storage management system determines that it should be moved to a higher performance storage layer. The information is then moved to the third lowest performance layer and so on until the information is finally moved to the highest performance layer as it should have been. Thus, the movement of the information across storage layers is very tedious and time consuming. Additionally, since the information is not moved immediately to the appropriate storage layer, the application is still not getting the desired performance.

Another problem with this approach is that the storage management system may move information to a layer having a higher performance due to the frequency of access, but the information does not actually need to be in this higher performance layer, thereby unnecessarily increasing the costs to the application. For example, an application may store information within the storage management system that is frequently accessed. However, the application may not need a quick response when accessing the information. Therefore, the application would prefer to maintain the information in the lower cost storage layer to reduce the cost to the application. However, the traditional storage management systems do not provide a mechanism for allowing the application to designate that the information should stay in the lower performance layer regardless of the frequency of access to the information.

Accordingly, an embodiment provides a system and method for determining a storage layer for storage of information based upon a storage layer category and a performance tolerance value. The system receives information for storage in the storage management system that has a plurality of storage layers, each layer having a different performance and cost than the other storage layers. Upon receiving the information, the system labels the information with an application label using a classification algorithm. The classification algorithm is a supervised machine learning algorithm that learns a classification function during a training phase. The algorithm then labels the information with an application label upon receipt of the information, using a supervised machine learning algorithm.

Additionally, the information is assigned a performance tolerance value that is based upon an estimate of the performance requirement of the application and is also based upon the label of the information. In other words, a performance tolerance value is assigned to each of the application labels. Thus, after the information is labelled with a label, the information can be assigned a performance tolerance value that corresponds to the label. This information can be based, at least in part, on information received by the application before the information is stored in the storage management system. Each of the labels is associated with a performance tolerance value. Therefore, the system can then assign, based upon the label of the information, a performance tolerance value to the information. From the performance tolerance value the system can identify which storage layer the information should be stored within. In other words, based upon the label and the performance tolerance value, the system can identify a storage layer to send the information to before the information is stored in the storage management system. The system can then send the information to the determined storage layer.

After the information is stored, if the storage management system determines that the information should be moved to a different storage layer, for example, based upon access frequency, user feedback, or the like, the system may move the information from one storage layer to another storage layer. For example, if a user provides input to overwrite the performance tolerance value of the information, the system may move the information to a different storage layer based upon this newly assigned performance tolerance value. In the event that the information needs to be moved across multiple layers, the system can move the information to the desired storage layer without requiring movements to any intermediate storage layers. In other words, the system can skip intermediate storage layers when moving the information from one storage layer to another.

Such a system provides a technical improvement over current conversational agent systems by providing a system that can determine a storage layer for information based upon an application label and a performance tolerance value. The application label is determined by a classification algorithm that is trained during a supervised training session. The information can then be classified before it is sent to the storage management system, thereby providing a more accurate storage layer selection than in traditional systems. Additionally, the system can estimate the application performance tolerance and assign a performance tolerance value to the information which can be used to identify the storage layer before the information is even stored. Thus, the application has some control over where the information is stored before the information is stored, which is not possible using conventional systems. Additionally, the system is able to move information across storage layers while skipping intermediate layers, providing for more efficient and quicker movement of information across storage layers. Thus, the system provides a storage management system that is more efficient, provides for a better balance between cost and performance for the application, and is able to more quickly move information across storage layers than conventional storage management systems. The conventional storage management systems migrate the data across the storage tiers or layers based on the frequency of the data access and how recent the data access occurred. Thus, the conventional storage management systems are reactive in nature to the data access, whereas the systems and methods described in this application proactively migrate the data across storage tiers or layers.

Figure 1:
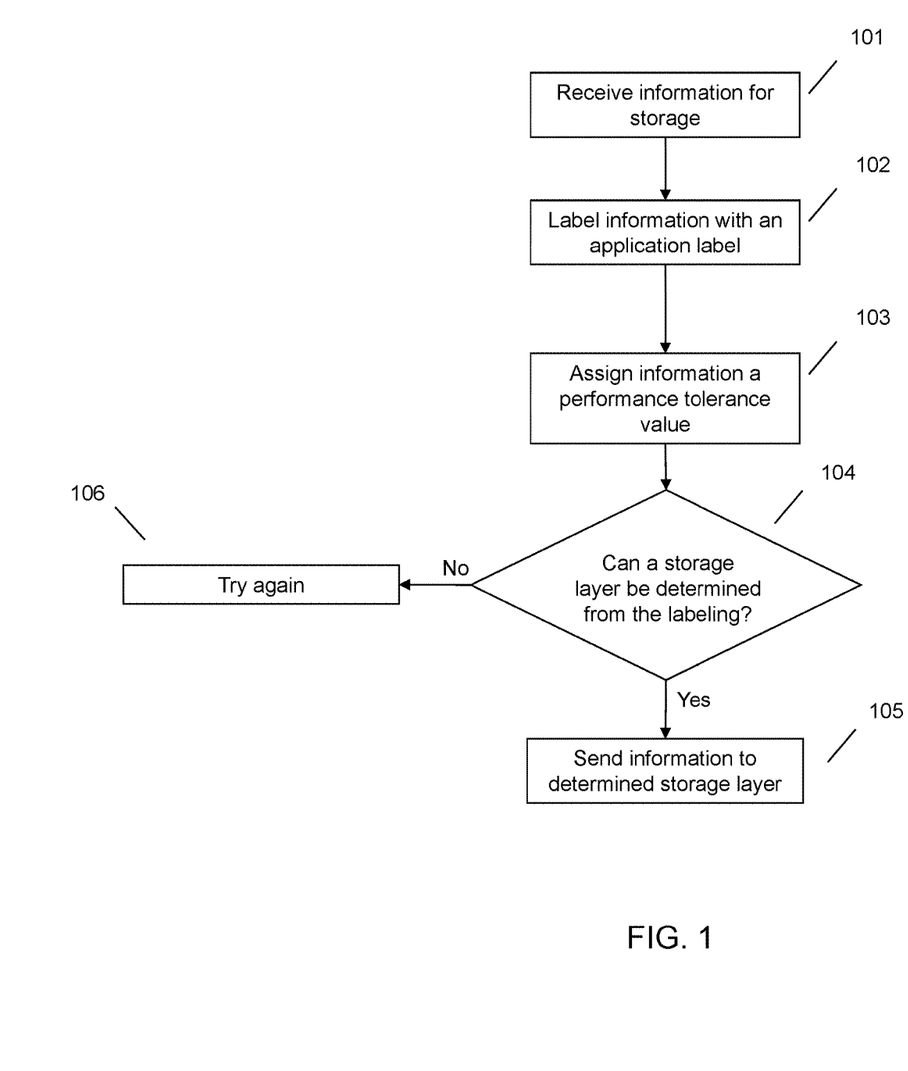
FIG. 1 illustrates a method of determining a storage layer for storage of information based upon an application label and a performance tolerance value.

FIG. 1 illustrates a method for determining a storage layer for storage of information based upon a storage layer category and a performance tolerance value. At 101 the system receives information from an application for storage in a storage management system. For example, the application may send the information to the storage management system or otherwise indicate to the storage management system that information is ready to be stored by the application at the storage management system. The storage management system includes a plurality of storage layers with each layer having a different performance and a different cost than the other storage layers. For example, a layer having a higher performance also has a higher cost to the application storing the information. Conversely, a layer having a lower cost to the application also has lower performance, thereby resulting in slower responses to access requests.

At 102 the system labels the information with a label that is relevant to the application. In other words, each application has a plurality of labels that are relevant to the application. For example, in a question and answer system or application, labels may include "relevant" and "not relevant". Thus, the system would label the information provided by the question and answer system or application with a "relevant" or "not relevant" label. Each application has a set of predefined categories or labels. Accordingly, at 102, the system labels the information received from the application with one of those predefined categories or labels.

To perform the labeling, classification, or categorization, the system may use a classification algorithm that maps the information to one of the application categories or labels. The classification algorithm may be a supervised machine learning system that learns a classification function during a training phase. The training phase uses historical information to identify which category or label a similar type of information was labeled with. Using the question and answer application example, a user may label pieces of information with either "relevant" or "not relevant" labels. The system may then use these user-provided labels during the training phase to learn a classification function. The classification function or algorithm can then be used by the system to label information with one of the labels during deployment of the system. Additionally, the classification function can be learned based upon the label that a piece or group of information was initially labeled with and which label the piece or group of information eventually was labeled with. In other words, if a user changes the label at a later time, the classification algorithm can be revised or can relearn based upon this new labelling. Additionally, the classification algorithm may learn performance requirements of the information and determine a label that corresponds to the performance requirements.

Using the historical information or user input, the algorithm can learn patterns between information types and appropriate labels. In the case that the same type of information gets assigned different or conflicting labels by different parts of the application or different applications, the classification algorithm may assign an aggregate label to the information item. The aggregate label may be based upon a weighted average, based upon the importance of the application providing the information, based upon the domain of the information or application, a combination of the foregoing, or the like. Accordingly, when new information is supplied to the storage management system, the classification algorithm can map the information to an appropriate category or label. Additionally, the classification algorithm may also take into account any application or user input that is provided when the information is provided to the storage management system. For example, a user may specifically identify a label that the information should be labelled with. Additionally, the classification algorithm may determine performance requirements of the information and label the information with the label corresponding to the performance requirements. As new information is categorized, the system may use these categorizations to further train the classification algorithm Each of these application categories or labels has a corresponding application performance value. Thus, at 103 the system may assign a performance tolerance value to the information. For example, the system or a user may assign a performance tolerance value to each of the labels. Thus, when the system labels the information with a label, the system may use the label to identify what performance tolerance value should be assigned to the information. Assigning a performance tolerance value may include determining a data access requirement that is required for accessing an information chunk. In other words, to label the information at 102 the system may chunk the information into application specific data groups. Then, while assigning the performance tolerance value, the system may determine the data access requirements that will be required for accessing each of the information chunks.

Thus, the performance tolerance value may be an estimate of the performance requirement required by the application. The estimate may be determined based upon the type of application that is storing the information. For example, an application that is performance sensitive (e.g., an application needing quick responses to access requests, etc.) may have a low tolerance, thereby requiring the information of that application be stored in a high performance layer. Conversely, an application that is not performance sensitive or has lower performance sensitivity (e.g., an application not needing quick responses to access requests, etc.) may have high performance tolerance, thereby preferring lower cost, lower performance storage layers.

The performance tolerance value can be based upon information received from the application. For example, the application can indicate the performance sensitivity of the application to the storage management system. The performance tolerance value may then be assigned based upon this indicated performance sensitivity. Once the performance tolerance value is estimated, the system can determine a storage layer that would fulfill that performance tolerance value. In other words, each performance tolerance value is associated with a particular storage layer. Thus, at this point, the information has an application label identified from the classification algorithm and a performance tolerance value identified from the application label, even before the information has been stored at the storage management system.

Accordingly, at 104, the system may determine whether a storage layer can be determined from the performance tolerance value assigned to the information based upon the information label. In other words, the system may determine, from the performance tolerance value, the storage layer that the information should be sent to. Each storage layer has a specific performance and/or cost. Thus, a performance tolerance value identifies the performance requirements necessary of the storage layer. Therefore, using the performance tolerance value, the system is able to identify which storage layer from the plurality of storage layers would fulfill or correspond to the performance tolerance value. For example, a storage layer having low performance may be categorized as a high storage layer, where the higher the storage category, the lower performance and lower cost. Conversely, using the same example, a storage layer having a high performance may be categorized as a low storage layer.

In determining the storage layer the system may update the metadata of the logical value corresponding to the information or information chunk with the performance tolerance value. Updating the metadata ensures that the information or information chunk will be sent to the storage layer or tier that corresponds to the performance tolerance value. In other words, updating the metadata with the performance tolerance value ensures that the information is sent to a storage layer that meets the performance requirement of the performance tolerance value.

Updating the metadata may include passing the performance tolerance value to the storage management system in kernel-space. Specifically, the system may update the logical volume metadata with the performance tolerance value. This allows the information to be written to the private disk region where the logical volume manager metadata reside. This enables synchronous communication between the application and the storage management system software. For example, the information provided by the application can be processed by the logical volume manger in kernel-space which allows movement of the information to a specific layer based upon the performance tolerance value.

If the storage layer cannot be determined at 104, the system may try to determine the storage layer again at 106. Alternatively, the system may assign the information to a default storage layer. If, however, the system can determine a storage layer at 104, the system may send the information to the determined storage layer at 105 based upon the metadata of the logical volume. In the case that the determined storage layer is full, the system may send the information to a storage layer having higher performance. If that storage layer is full, the system may send the information to a layer having a different performance, for example, a higher or lower performance as identified by a user. If all the other performance layers are full, the system may determine if a piece of information in the determined storage layer (i.e., the storage layer that was identified at 104) is a candidate for replacement. This candidate information piece may be identified as information that is no longer accessed, information that has been moved to a different layer but not removed from this layer, or the like. If a candidate information piece cannot be identified then the system may replace the information piece that is the least recently used with the information.

Figure 2:
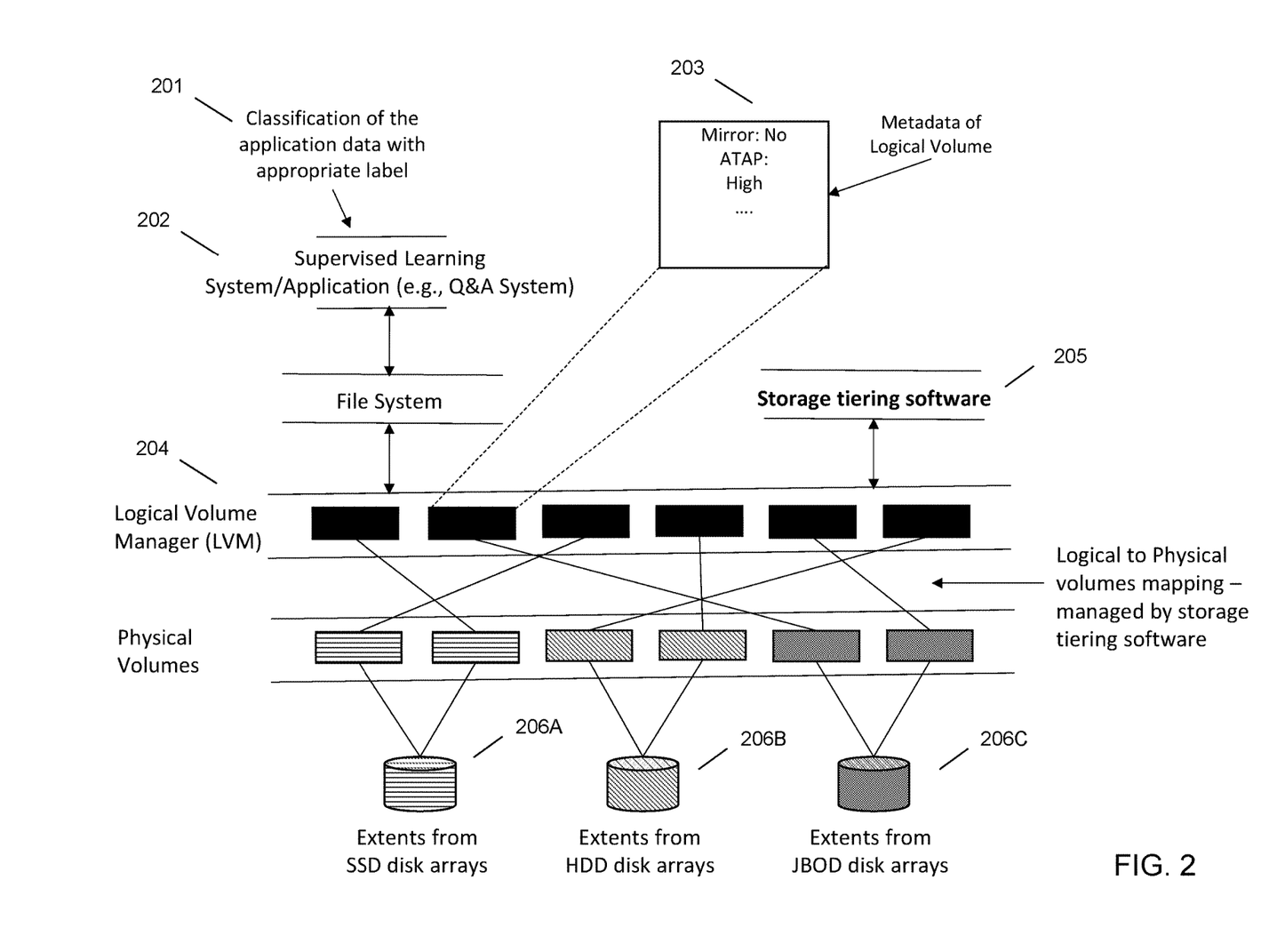
FIG. 2 illustrates an overall example of determining a storage layer for storage of information.
Figure 3:
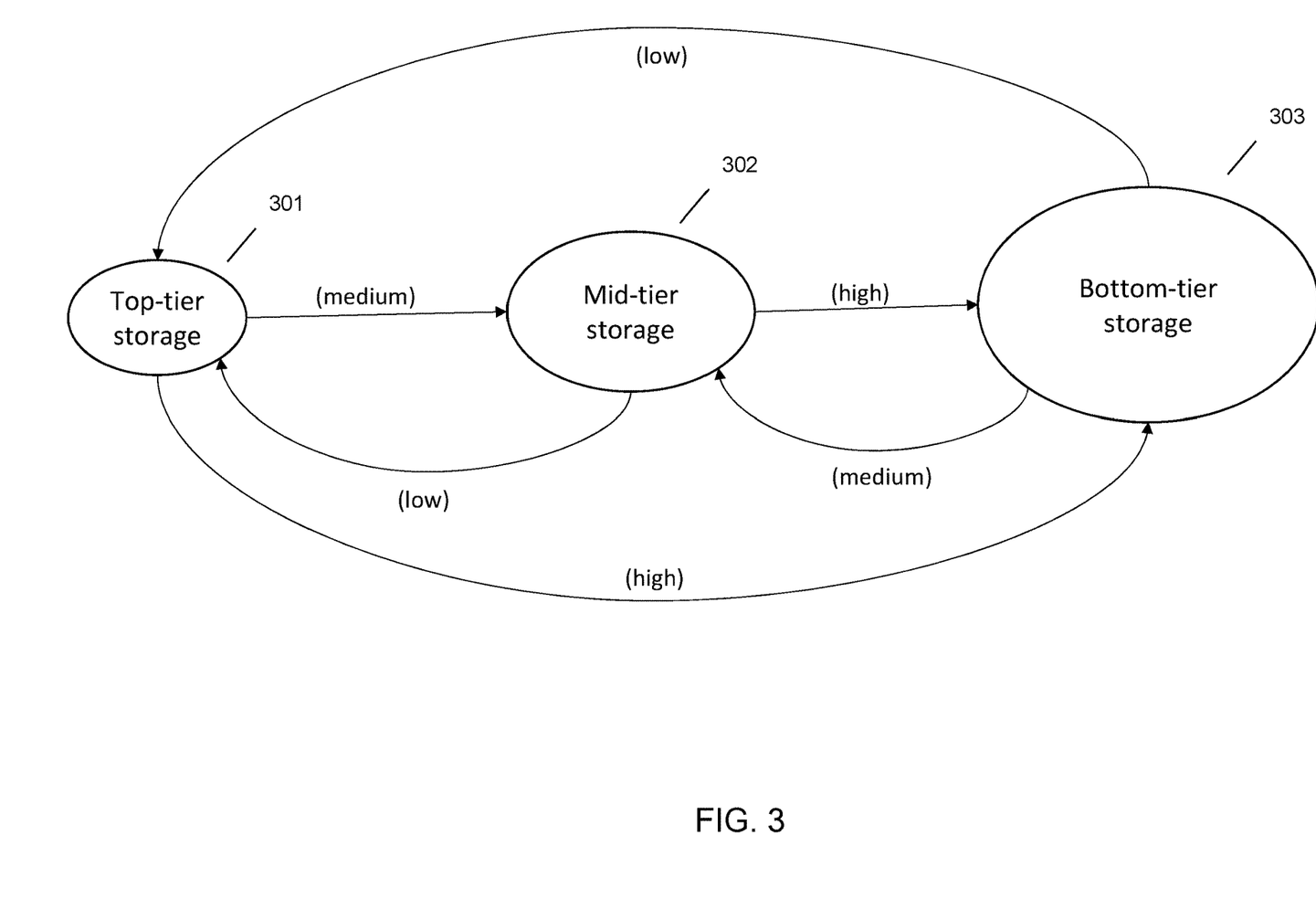
FIG. 3 illustrates an example of information movement across storage layers.

FIG. 2 illustrates an overall example of determining the storage layer after the information has been labeled 201 using the supervised learning application 202. Using the label the system identifies the performance tolerance value and maps the information to the appropriate storage layer 203. The performance tolerance value is then passed to the logical volume manager 204 via updating the metadata of the logical volume. The storage tiering software 205 manages the mapping of the logical volumes to physical volumes, thereby allowing for movement of the information to the appropriate storage layer 206A, 206B, and/or 206C based upon the performance tolerance value and the application label.

Once the information is written to a storage layer, the system may determine that the information needs to be moved to a different storage layer. For example, the system may determine that based upon an access frequency or a timing of access (e.g., recent accesses, old accesses, etc.) the information should be stored in a higher storage layer. As another example, the application may change the required performance, thereby requiring a different storage layer that can fulfill the new performance requirement. Additionally, a user may provide input changing the performance tolerance value assigned to information or an information chunk. Based upon this new performance tolerance value the system may identify that the current storage layer does not meet the new performance tolerance value and may, therefore, determine that the information should be moved to a different storage layer that meets the performance tolerance value. The system may also balance movement of the information based upon different conditions. For example, the system may balance movement of the information based upon a performance tolerance value assigned by the user and the user access patterns of the information (e.g., frequency of access, recent accesses, etc.).

The described system allows movement of the information across the storage layers by skipping intermediate storage layers. For example, referring to FIG. 3, if the information is stored in the bottom-tier storage 303 (which has the highest performance) and needs to be moved to the top-tier storage 301 (which has the lowest performance), the system can skip the mid-tier storage 302. This is in contrast to conventional systems which require that the information be first moved to the mid-tier storage 302 and then to the top-tier storage 301. As another example, if the information needs to be moved from the top-tier storage 301 to the bottom-tier storage 303, the information can skip the mid-tier storage 302. However, the system still allows movement between adjacent storage layers. For example, if the information needs to be moved from the bottom-tier storage 303 to a medium performance tier, the mid-tier storage 302, the system can move the information directly from the bottom-tier 303 to the mid-tier 302.

Thus, the described systems and methods represent a technical improvement over current storage management systems by providing a storage management system that is proactive, rather than reactive as in conventional systems, thereby making a more efficient storage management system. The application can provide input into which storage layer the information should be stored within, thereby resulting in selection of a storage layer that provides the performance necessary by the application but at the lowest cost. Additionally, the described system can move information across storage layers without requiring movement to intermediate storage layers, thereby providing more efficient information movement without movement to unnecessary storage layers. Thus, the described system is more efficient and faster than conventional storage management systems. Additionally, the described system provides the application the best performance for the lowest cost as compared to conventional storage management systems.

Figure 4:
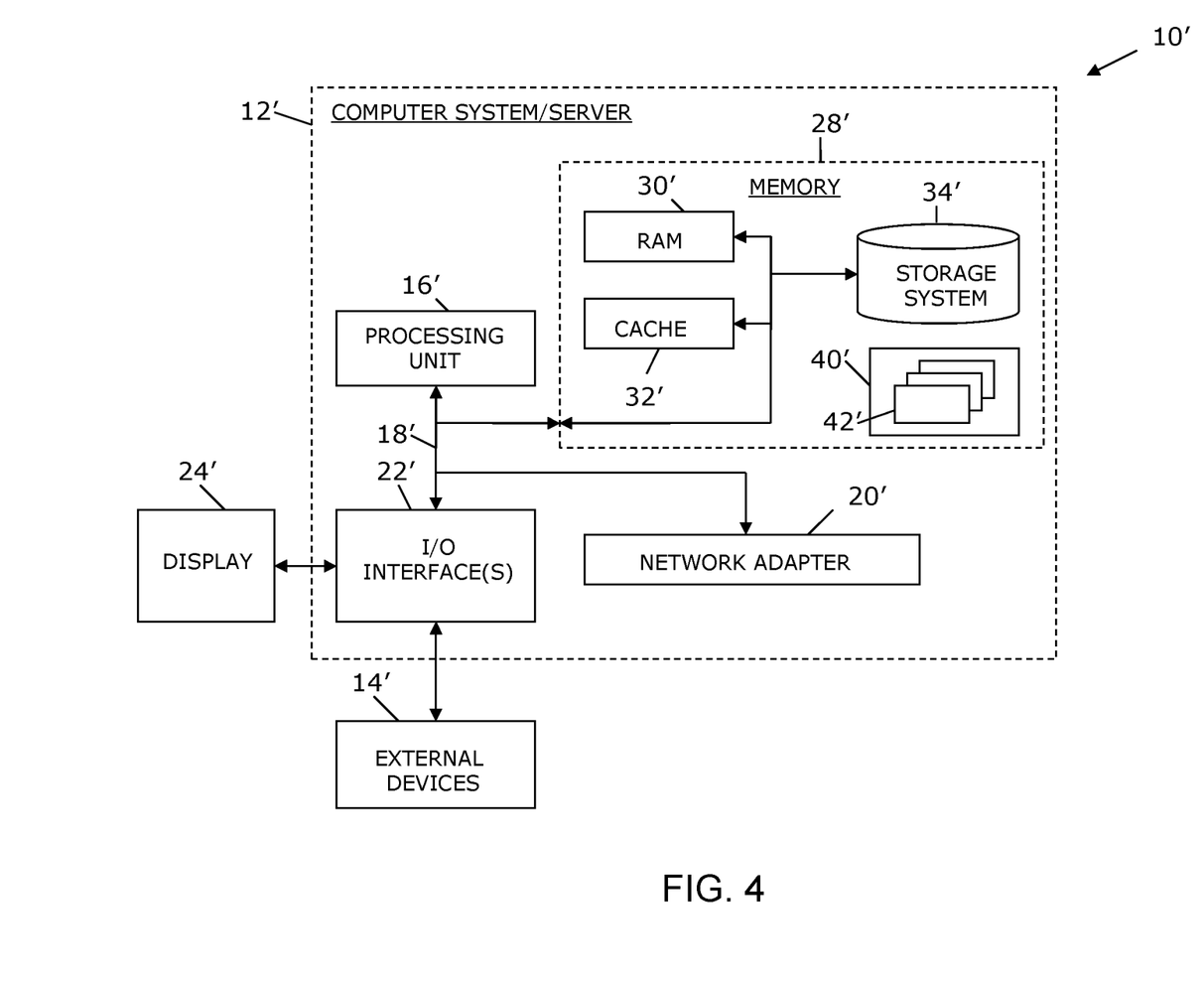
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, from an application, information for storage in a storage management system, wherein the storage management system comprises a plurality of storage layers, each storage layer having a different performance and a different cost than the other storage layers;
   labeling, using a classification algorithm, the information with one of a plurality of labels relevant to the application;
   assigning the information a performance tolerance value based upon the label of the information, wherein the performance tolerance value comprises an estimate of the performance requirement required by the application storing the information;
   determining, based upon the performance tolerance value of the information, a storage layer for storage of the information, wherein the determining comprises identifying one of the plurality of storage layers corresponding to the label of the information and updating metadata of a logical volume corresponding to the information with the performance tolerance value; and
   sending the information to the determined storage layer based upon the metadata of the logical volume.

2. The method of claim 1, wherein the labeling comprises using user feedback received with the information to label the information.

3. The method of claim 1, wherein the classification algorithm comprises a supervised machine learning algorithm trained during a training phase.

4. The method of claim 1, wherein the labeling comprises chunking the information into application specific data groups; and
   the method comprising assigning a performance tolerance value to each of the chunks of information by determining a data access requirement needed while accessing the corresponding data chunk.

5. The method of claim 1, comprising changing the assigned performance tolerance value of the information based upon user feedback.

6. The method of claim 5, comprising moving the information to a storage layer different than the determined storage layer based upon the changed performance tolerance value.

7. The method of claim 1, comprising sending the information to a storage layer having different performance if the determined storage layer is full.

8. The method of claim 7, comprising overwriting information contained in the determined storage layer if all storage layers are full.

9. The method of claim 1, comprising moving the information to a different storage layer upon accessing the information by the application after it is stored.

10. The method of claim 1, wherein the updating the metadata comprises passing the performance tolerance value in kernel-space.

11. An apparatus, comprising:
    at least one processor; and
    a computer readable storage medium having computer readable program code embodied therewith and executable by the at least one processor, the computer readable program code comprising:
    computer readable program code configured to receive, from an application, information for storage in a storage management system, wherein the storage management system comprises a plurality of storage layers, each storage layer having a different performance and a different cost than the other storage layers;
    computer readable program code configured to label, using a classification algorithm, the information with one of a plurality of labels relevant to the application;
    computer readable program code configured to assign the information a performance tolerance value based upon the label of the information, wherein the performance tolerance value comprises an estimate of the performance requirement required by the application storing the information;
    computer readable program code configured to determine, based upon the performance tolerance value of the information, a storage layer for storage of the information, wherein the determining comprises identifying one of the plurality of storage layers corresponding to the label of the information and updating metadata of a logical volume corresponding to the information with the performance tolerance value; and
    computer readable program code configured to send the information to the determined storage layer based upon the metadata of the logical volume.

12. A computer program product, comprising:
    a computer readable storage medium having computer readable program code embodied therewith, the computer readable program code executable by a processor and comprising:
    computer readable program code configured to receive, from an application, information for storage in a storage management system, wherein the storage management system comprises a plurality of storage layers, each storage layer having a different performance and a different cost than the other storage layers;
    computer readable program code configured to label, using a classification algorithm, the information with one of a plurality of labels relevant to the application;
    computer readable program code configured to assign the information a performance tolerance value based upon the label of the information, wherein the performance tolerance value comprises an estimate of the performance requirement required by the application storing the information;
    computer readable program code configured to determine, based upon the performance tolerance value of the information, a storage layer for storage of the information, wherein the determining comprises identifying one of the plurality of storage layers corresponding to the label of the information and updating metadata of a logical volume corresponding to the information with the performance tolerance value; and computer readable program code configured to send the information to the determined storage layer based upon the metadata of the logical volume.

13. The computer program product of claim 12, wherein the labeling comprises using user feedback received with the information to label the information.

14. The computer program product of claim 12, wherein the labeling comprises chunking the information into application specific data groups; and the computer program code comprising assigning a performance tolerance value to each of the chunks of information by determining a data access requirement needed while accessing the corresponding data chunk.

15. The computer program product of claim 12, comprising changing the assigned performance tolerance value of the information based upon user feedback.

16. The computer program product of claim 15, comprising moving the information to a storage layer different than the determined storage layer based upon the changed performance tolerance value.

17. The computer program product of claim 12, comprising sending the information to a storage layer having different performance if the determined storage layer is full.

18. The computer program product of claim 12, comprising moving the information to a different storage layer upon accessing the information after it is stored, wherein the moving comprises skipping at least one storage layer.

19. The computer program product of claim 12, wherein the sending comprises updating, in kernel-space, metadata within the storage management system with the performance tolerance value.

20. A method, comprising:

receiving application information for storage in a storage system comprising a plurality of storage tiers, each storage tier having a different performance and a different cost to the application than the other storage tiers;

determining a storage tier within the storage system for storage of the application information by:

classifying the application information to a storage tier by using a machine learning storage tier classifier that maps the application information to a storage tier based upon a function learned during the training phase of the machine learning storage tier classifier;

assigning a performance tolerance value to the information based upon the performance requirements of an application storing the application information, wherein the performance tolerance value is based upon the classified storage tier;

updating metadata of a logical volume corresponding to the application information with the assigned performance value; and identifying a storage tier corresponding to the classification; and storing the application information in the determined storage tier.

* * * * *